United States Patent [19]
Perlman et al.

[11] Patent Number: 6,094,525
[45] Date of Patent: *Jul. 25, 2000

[54] NETWORK ADDRESSING ARRANGEMENT FOR BACKWARD COMPATIBLE ROUTING OF AN EXPANDED ADDRESS SPACE

[75] Inventors: Radia J. Perlman, Acton, Mass.; Neal D. Castagnoli, Morgan Hill, Calif.

[73] Assignee: Novell, Inc., Orem, Utah

[ * ] Notice: This patent issued on a continued prosecution application filed under 37 CFR 1.53(d), and is subject to the twenty year patent term provisions of 35 U.S.C. 154(a)(2).

[21] Appl. No.: 08/499,103
[22] Filed: Jul. 6, 1995
[51] Int. Cl.⁷ .................................. H04L 12/46
[52] U.S. Cl. ................ 395/200.75; 395/200.68
[58] Field of Search ............ 395/200.16, 200.02, 395/827, 200.75, 200.68; 370/94.1, 60, 852, 853, 401, 409, 411, 903, 902, 908, 911, 912; 340/825.52

[56] References Cited

U.S. PATENT DOCUMENTS

| | | | |
|---|---|---|---|
| 5,048,014 | 9/1991 | Fischer | 370/85.5 |
| 5,095,480 | 3/1992 | Fenner | 370/94.1 |
| 5,214,646 | 5/1993 | Yacoby | 370/85.14 |
| 5,282,270 | 1/1994 | Oppenheimer et al. | 395/200.16 |
| 5,287,103 | 2/1994 | Kasprzyk et al. | |
| 5,309,437 | 5/1994 | Perlman et al. | 370/85.13 |
| 5,315,595 | 5/1994 | Allouis et al. | 370/110.1 |
| 5,388,213 | 2/1995 | Oppenheimer et al. | 395/200.16 |
| 5,430,715 | 7/1995 | Corbalis et al. | |
| 5,448,566 | 9/1995 | Richter et al. | 370/94.1 |
| 5,483,524 | 1/1996 | Lev et al. | 370/60.1 |
| 5,509,123 | 4/1996 | Dobbins et al. | 395/200.15 |
| 5,541,927 | 7/1996 | Kristol et al. | 370/94.2 |
| 5,644,571 | 7/1997 | Seaman | 370/401 |

OTHER PUBLICATIONS

Computer Communications Review, vol. 18, No. 4, Aug. 1988, New York US, pp. 35–42, P.F. Tsuchiya, The Landmark Hierarchy: A New Hierarchy for Routing in Very Large Networks.

Computer Communications, vol. 13, No. 5, Jun. 1, 1990, pp. 290–297, Gee–Swee Poo et al., OSI Addressing Strategies for Interconnected LANs.

Computer Communications Review, vol. 24, No. 4, Oct. 1, 1994, pp. 116–125, Francis P. et al., Flexible Routing and Addressing for a Next Generation IP.

Apple Computer, "Appletalk Update–Based Routing Protocol: Enhanced Appletalk Routing", Aug. 1993, pp. 1–34.

*Primary Examiner*—Zarni Maung
*Assistant Examiner*—Saleh Najjar
*Attorney, Agent, or Firm*—Cesari and McKenna, LLP

[57] ABSTRACT

An improved network addressing arrangement expands both the format of a network layer header and the address spaces of nodes coupled to computer networks in a manner that efficiently enhances routing among nodes of different domains of the networks. Specifically, the novel arrangement provides new elements to a conventional hierarchical network layer address and modifies existing elements, i.e., destination network and socket numbers, of that address to effectively create an improved network layer header.

10 Claims, 7 Drawing Sheets

NETWORK ADDRESSING ARRANGEMENT FOR BACKWARD COMPATIBLE ROUTING OF AN EXPANDED ADDRESS SPACE

FIELD OF THE INVENTION

This invention relates generally to computer networks and, more particularly, to expanding the address spaces of nodes coupled to a computer network.

BACKGROUND OF THE INVENTION

A computer network is a geographically distributed collection of interconnected communication links for transporting data between nodes, such as computers. Many types of computer networks are available, with the types ranging from local area networks (LANs) to wide area networks (WANs). A LAN is a limited area network that typically consists of a transmission medium, such as coaxial cable or twisted pair, while a WAN may be a public or private telecommunications facility that interconnects nodes widely dispersed. These nodes typically communicate by exchanging discrete "packets" of data according to predefined protocols. In this context, a protocol consists of a set of rules defining how the nodes interact with each other.

Computer networks may be further interconnected by an intermediate node, called a router, to extend the effective "size" of each network. Since management of a large system of interconnected computer networks can prove burdensome, smaller groups of computer networks may be maintained as an autonomous system or domain; the networks within a domain are typically coupled together by conventional "intradomain" routers. However, it still may be desirable to increase the number of nodes capable of exchanging data and, in this case, interdomain routing protocols are used to allow interaction among the nodes of the domains.

In order to reduce design complexity, most networks are organized as a series of hardware and software levels or "layers" within each node. These layers interact to format data for transfer between, e.g., a source node and a destination node communicating over the network. Specifically, predetermined services are performed on the data as it passes through each layer and the layers communicate with each other by means of the predefined protocols. This layered design permits each layer to offer selected services to other layers using a standardized interface that shields those layers from the details of actual implementation of the services.

In an attempt to standardize network architectures, i.e., the sets of layers and protocols used within a network, a generalized model has been proposed by the International Standards Organization (ISO). The model, called the Open Systems Interconnection (OSI) reference model, is directed to the interconnection of systems that are "open" for communication with other systems. The proposed OSI model has seven layers which are termed, in ascending interfacing order, the physical, data link, network, transport, session, presentation, and application layers. These layers are arranged to form a "protocol stack" in each node of the network.

FIG. 1 illustrates a schematic block diagram of prior art protocol stacks 125 and 175 used to transmit data between a source node 110 and a destination node 150, respectively, of a computer network 100. Each protocol stack is structured according to the OSI seven-layer model; accordingly, each stack comprises a collection of protocols, one per layer. As can be seen, the protocol stacks 125 and 175 are physically connected through a communications channel 180 at the physical layers 124 and 164. For ease of description, the protocol stack 125 will be described.

Broadly stated, the physical layer 124 transmits a raw data bit stream over a communication channel 180, while the data link layer 122 manipulates the bit stream and transforms it into a datastream that appears free of transmission errors. This latter task is accomplished by dividing the transmitted data into frames and transmitting the frames sequentially, accompanied with error correcting mechanisms for detecting or correcting errors. The network layer 120 routes data packets from the source node to the destination node by selecting one of many alternative paths through the physical network. The transport layer 118 accepts the datastream from the session layer 116, apportions it into smaller units (if necessary), passes the smaller units to the network layer 120 and provides appropriate mechanisms to ensure that all the units arrive correctly at the destination.

The session layer 116 establishes data transfer "sessions" between software processes on the source and destination nodes, along with management of such sessions in an orderly fashion. That is, a session not only allows ordinary data transport between the nodes, but it also provides enhanced services in some applications. The presentation layer 114 performs frequently-requested functions relating to the presentation of transmitted data, including encoding of data into standard formats, while the application layer 112 contains a variety of protocols that are commonly needed by processes executing on the nodes.

Data transmission over the network 100 therefore consists of generating data in, e.g., a sending process 104 executing on the source node 110, passing that data to the application layer 112 and down through the layers of the protocol stack 125, where the data are sequentially formatted as a packet for delivery onto the channel 180 as bits. Those packet bits are then transmitted to the protocol stack 175 of the destination node 150, where they are passed up that stack to a receiving process 174. Data flow is schematically illustrated by solid arrows.

Although actual data transmission occurs vertically through the stacks, each layer is programmed as though such transmission were horizontal. That is, each layer in the source node 100 is programmed to transmit data to its corresponding layer in the destination node 150, as schematically shown by dotted arrows. To achieve this effect, each layer of the protocol stack 125 in the source node 110 typically adds information (in the form of a header field) to the data packet generated by the sending process as the packet descends the stack. At the destination node 150, the various headers are stripped off one-by-one as the packet propagates up the layers of stack 175 until it arrives at the receiving process.

As noted, a significant function of each layer in the OSI model is to provide services to the other layers. Two types of services offered by the layers are "connection-oriented" and "connectionless" network services. In a connection-oriented service, the source node establishes a connection with a destination node and, after sending a packet, terminates the connection. The overhead associated with establishing the connection may be unattractive for nodes requiring efficient comninucation performance. For this case, a fully connectionless service is desirable where each transmitted packet carries the fill address of its destination through the network.

Network layer protocols are generally used to implement a connectionless network service, the latter of which primarily defines a packet format. When the network layer receives a packet from the transport layer for transmission over the network, it adds (to the packet) a header containing, inter alia, source and destination addresses. Examples of network layer protocols are the connectionless network layer protocol (CLNP) defined by ISO, the Internet (IP) network layer protocol and the Internet Packet Exchange (IPX) protocol.

The header fields defined by the network layer services are generally the same primarily because the same information are typically contained in each packet. For example, most of these headers contain fixed-length, hierarchical addresses configured to accomodate relatively large numbers of nodes coupled to the networks. In the case of an IPX header, the source and destination addresses are hierarchical and consist of a plurality of elements, including a 4-byte network number, a 6-byte node number and a 2-byte socket number. An exception involves the CLNP header which is configured to handle a potentially wider range of network layer addresses. Nevertheless, address expansion for all of these headers is by and large constrained because of the generally fixed formats of their address fields.

The overall packet formats of the CLNP and IP headers may be further enlarged to accommodate added features by way of option fields contained within those headers. The types of options supported by these fields typically include source routing, priority and security-specific information. However, the conventional IPX header format is generally not expandable since its header was not designed to accomodate appended fields in a manner that is compatible with the remaining fields of the packet.

SUMMARY OF THE INVENTION

The invention comprises an improved network addressing arrangement for expanding the address spaces of nodes coupled to computer networks in a manner that efficiently enhances routing among nodes of different domains of the networks. That is, the novel arrangement improves network addressing by providing new elements to a conventional hierarchical network layer address and modifying existing elements, i.e., destination network and socket numbers, of that address to effectively create an improved network layer header.

In addition, the network addressing arrangement allows for an expanded header field format of the improved network layer header that maximizes the capabilities of interdomain routers, i.e., those routers within corresponding domains that are capable of reaching other domains across the networks, while ensuring that conventional intradomain routers continue to operate on the contents of the fields constituting conventional network layer headers without disruption.

Specifically, the inventive arrangement provides a special network value that uniquely identifies interdomain routers and substitutes that value for the destination network number of the conventional network address. A special socket value is further provided for the destination socket number, the special socket value indicating the provision of additional expander header information after source address fields of the header. In addition, the arrangement provides novel domain numbers that identify the appropriate destination and source domains. As noted, the domain numbers are added to the conventional network address and, because of the generally fixed formats of network layer headers, they are stored in the expanded header fields.

In the illustrative embodiment of the invention, each interdomain router couples its corresponding domain to a backbone network. Operationally, a source node sets the destination network and socket numbers to their special values prior to sending a packet to a destination node within a different domain. The actual destination network and socket numbers, together with the novel destination domain numbers, are stored in expanded header fields of the packet. The packet is then transmitted over the networks and, because the inserted destination network value uniquely identifies interdomain routers, conventional intradomain routers simply forward the packet to the appropriate interdomain router based on that value.

Upon reaching an interdomain router, the packet is analyzed in accordance with the special socket value of the network destination address; that is, the router examines the contents of the expanded header fields to determine if its corresponding destination domain number is specified in the packet. If the interdomain router is not the specified router, the packet is further routed based on that domain number. When the packet reaches the appropriate interdomain router connecting to the desired destination domain, that router replaces the special values with the actual destination network and socket numbers, and proceeds to route the packet to the appropriate destination node.

Advantageously, the present invention provides a technique for expanding network addresses from a seemingly immutable packet format in a manner that obviates upgrading of conventional intradomain routers. Since only interdomain routers need to be configured to interpret the inventive addressing arrangement, the technique enables backward compatibility with existing routers.

Moreover, the invention facilitates routing based on different sections of the network layer address. This increases the efficiency of network addressing because most routers need only examine a designated portion, i.e., the 4-byte destination network number field, of the network layer header prior to forwarding packets. Only an interdomain router need examine the remainder of the addressing information.

BRIEF DESCRIPTION OF THE DRAWINGS

The above and further advantages of the invention may be better understood by referring to the following description in conjunction with the accompanying drawings in which.

DETAILED DESCRIPTION OF ILLUSTRATIVE EMBODIMENT

Figure 1:
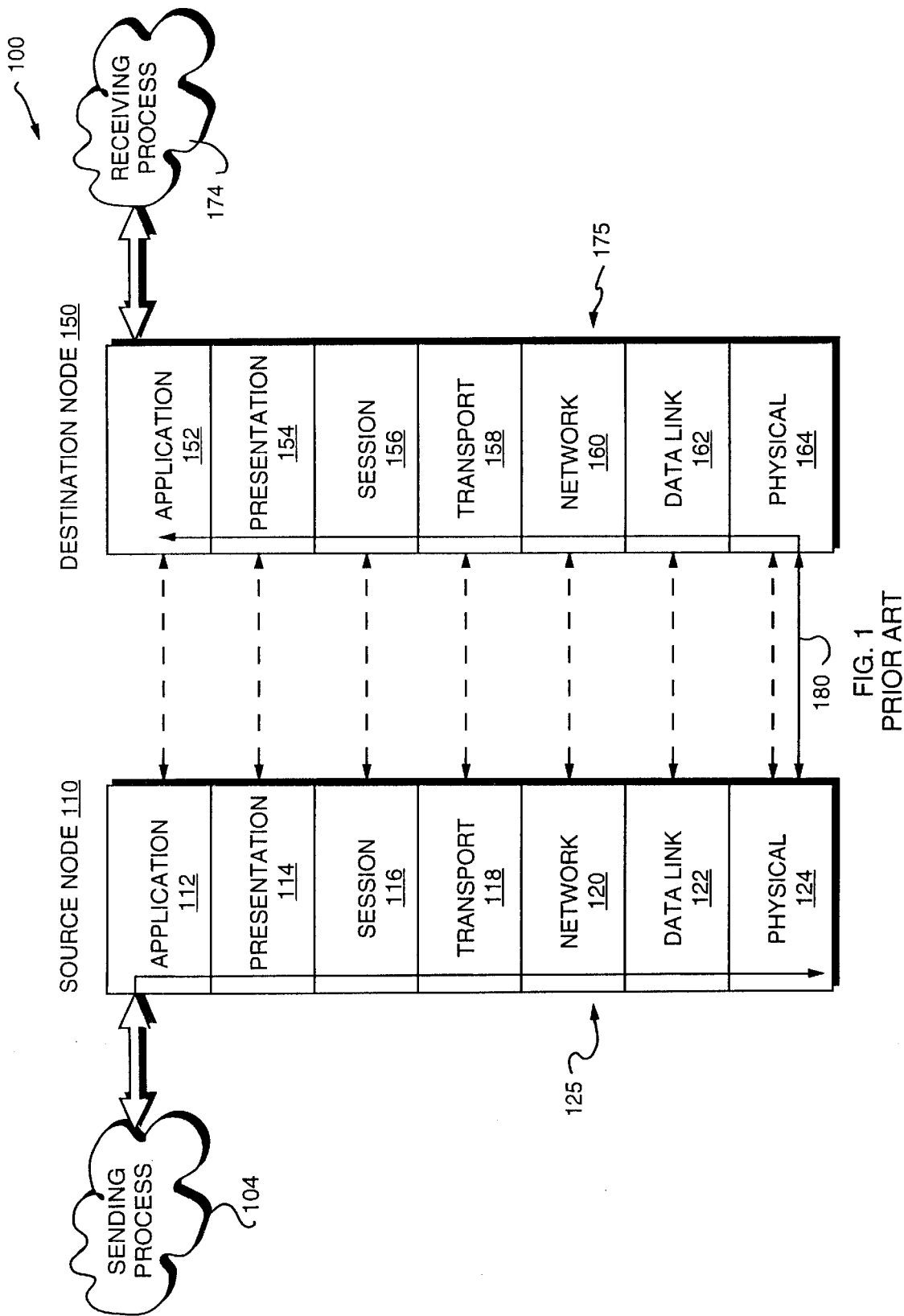
FIG. 1 is a schematic block diagram of prior art protocol stacks used to transmit data between a source node and a destination node of a computer network.
Figure 2:
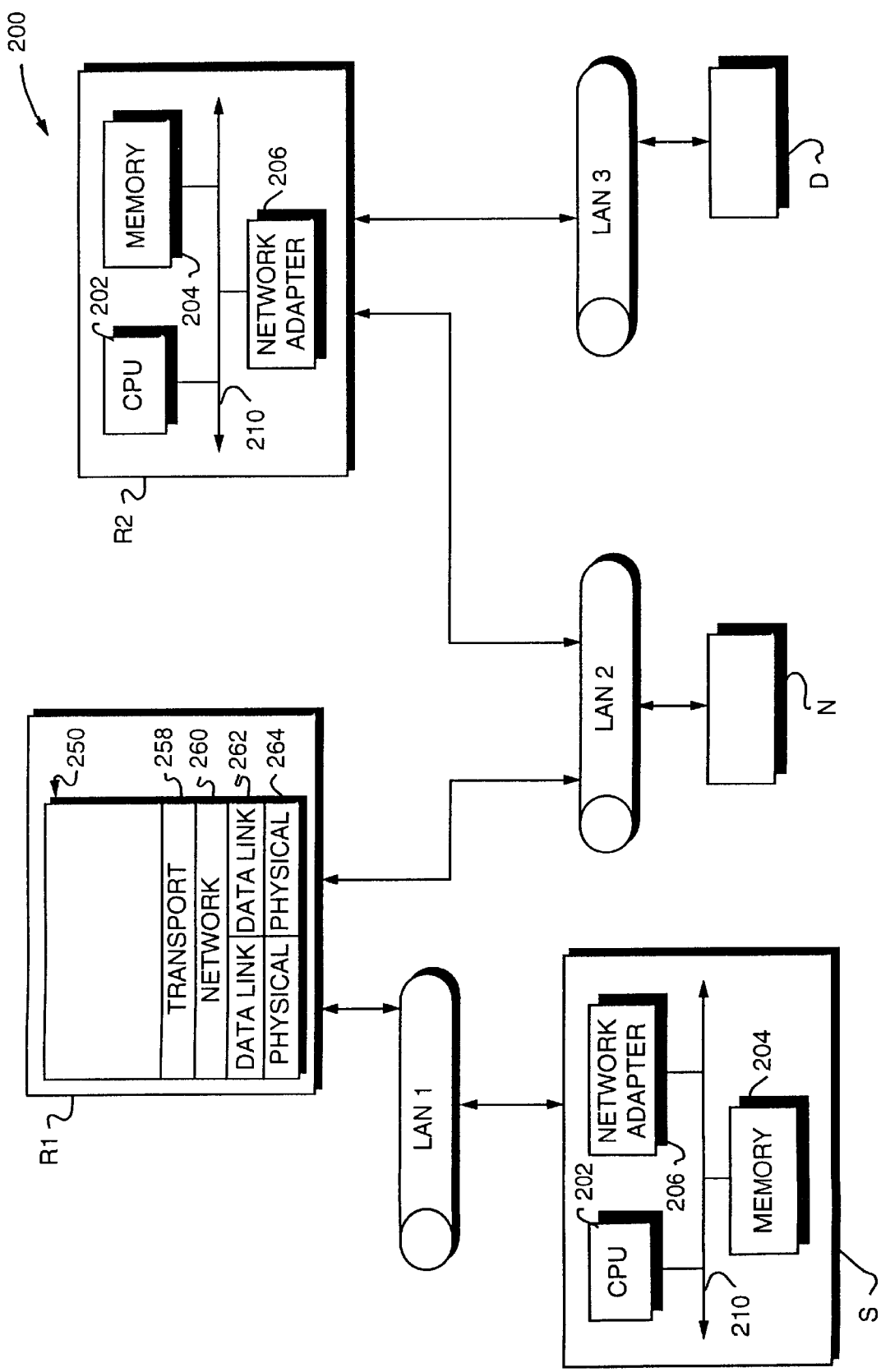
FIG. 2 is a block diagram of a computer network domain including a collection of computer networks connected to a plurality of nodes.

FIG. 2 is a block diagram of a network system 200 comprising a collection of computer networks connected to a plurality of nodes. The nodes are typically general-purpose computers comprising a source node S, an end node N, a destination node D and a plurality of intermediate nodes R1–R2. Each node typically comprises a central processing unit (CPU) 202, a memory unit 204 and at least one network adapter 206 interconnected by a system bus 210. The memory unit 204 may comprise storage locations typically composed of random access memory (RAM) devices, which are addressable by the CPU 202 and network adapter 206. An operating system, portions of which are typically resident in memory and executed by CPU, functionally organizes the node by, inter alia, invoking network operations in support of processes executing in the CPU.

The computer networks included within system 200 are local area networks (LANs) 1–3 interconnected by intermediate nodes R1 and R2. Communication among the nodes coupled to the LANs is typically effected by exchanging discrete data "packets" specifying addresses of, e.g., source and destination nodes. Since the system comprises a relatively small group of interconnected LANs, it is preferably maintained as an autonomous domain; accordingly, the intermediate nodes are preferably intradomain routers configured to facilitate the flow of data packets throughout the domain 200 by routing those packets to the proper receiving nodes.

In general, when a source node S transmits a packet over LAN 1, the packet is sent to all nodes on that LAN. If the intended recipient of the packet is connected to LAN 3, the packet is routed through router R1, over LAN 2 and through R2 onto LAN 3. A key function of a router is determining the next node to which the packet is sent; this routing function is preferably performed by network layer 260 of a protocol stack 250 within each node. Typically, the packet contains two destination addresses: the address of the final destination node and the address of the next node along the route. The final destination address remains constant as the packet traverses the networks, while the next destination address changes as the packet moves from node to node along the route through the networks.

Specifically, when source node S sends a packet to destination node D, i.e., the final destination address, the packet is transmitted onto LAN 1 with a next destination address specifying the address of router R1. Address information embedded in the packet, which is processed by the higher-layer software of the protocol stack 250, identifies the final destination of the packet as node D. Based on this information, R1 determines that the next node along the route is router R2 and proceeds to pass the packet onto LAN 2 for reception by that node. Router R2 then determines that the next node is the final destination node D and transmits the packet over LAN 3 to node D.

For routers R1 and R2 to be used in domain 200, the interconnected networks must share the same network layer protocols and must be compatible at the higher protocol stack layers. The networks may, however, differ at the data link layer 262 and the physical layer 264, as shown schematically in the protocol stack 250 of R1 which couples LAN 1 to LAN 2. The routers may operate with network layer protocols such as the connectionless network layer protocol (CLNP) and the Internet (IP) network layer protocol; however, in the illustrative embodiment described herein, the network layer protocol is preferably the Internet Packet Exchange (IPX) protocol.

Figure 3A:
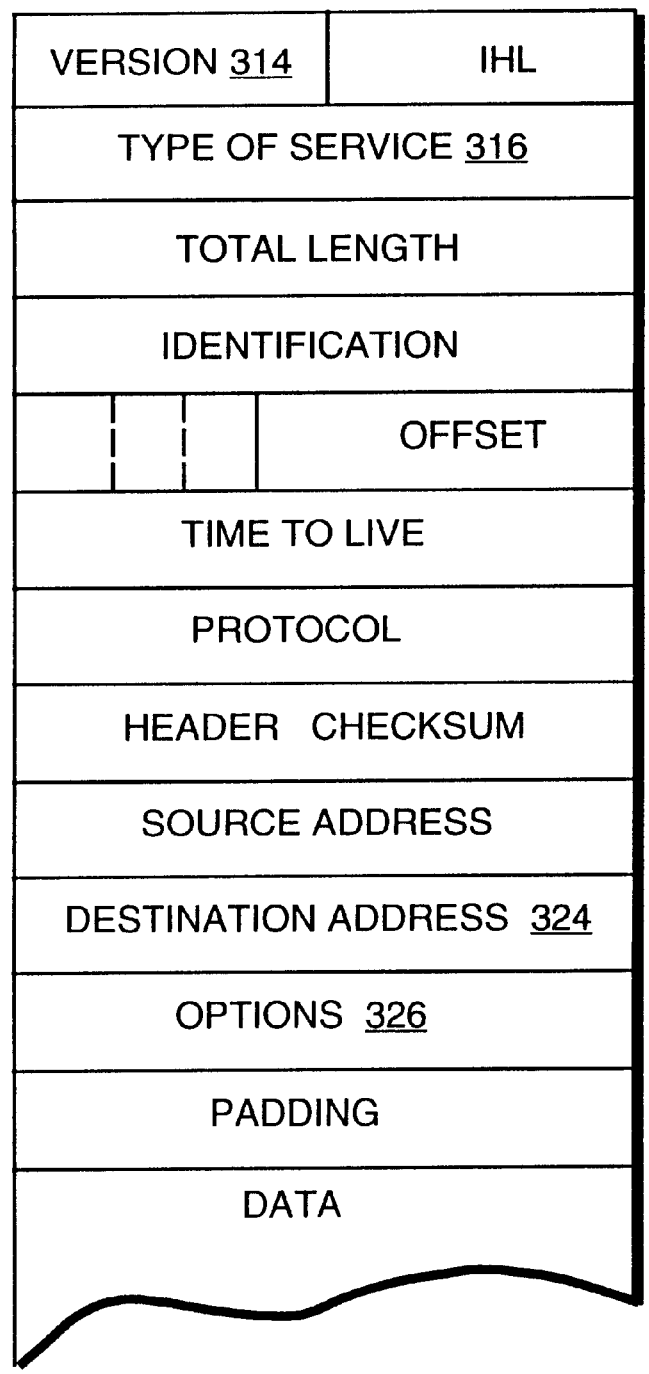
FIGS. 3A, 3B, & 3C are schematic diagrams depicting the formats of conventional network layer headers having options fields for storing information pertaining to a novel network addressing arrangement in accordance with the invention.
Figure 3B:
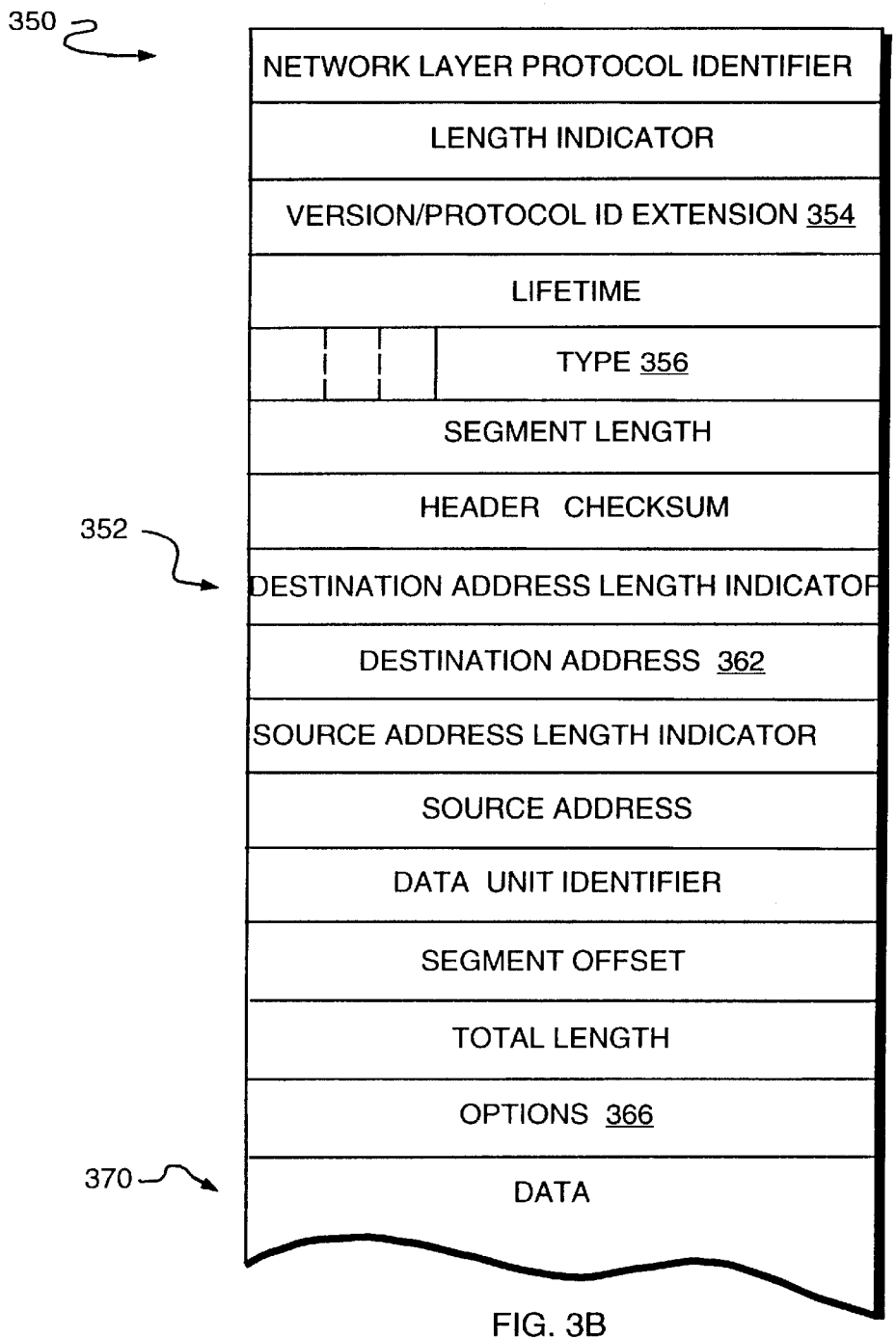
Figure 3C:
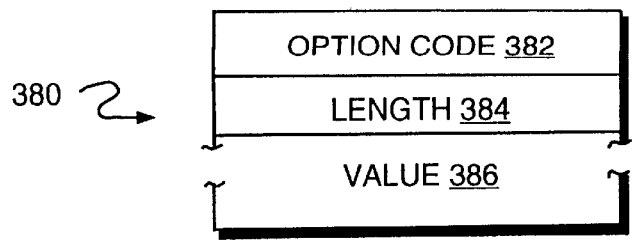

As noted, when the network layer 260 receives a packet from the transport layer 258 for transmission over the network, it adds a network layer header. The formats of these header fields are generally the same among all network layer services primarily because the same information are typically contained in each packet. FIGS. 3A and 3B depict the formats of IP and CLNP network layer packets 310 and 350, respectively. It can be seen that both of these packets contain similar information in their headers 312 and 352 (e.g., version number fields 314 and 354); more particularly, though, each header includes an options field 326 and 366 to accommodate added features. The types of options supported by these fields typically include source routing, priority and security-specific information. FIG. 3C depicts the general format of the contents of an options field 380 which comprises an octet (1-byte) option code field 382 that uniquely defines a type of option, a 1-byte length field 384 indicating the length of the option in bytes, and a variable, e.g., 0–254 byte, value field 386.

Figure 4:
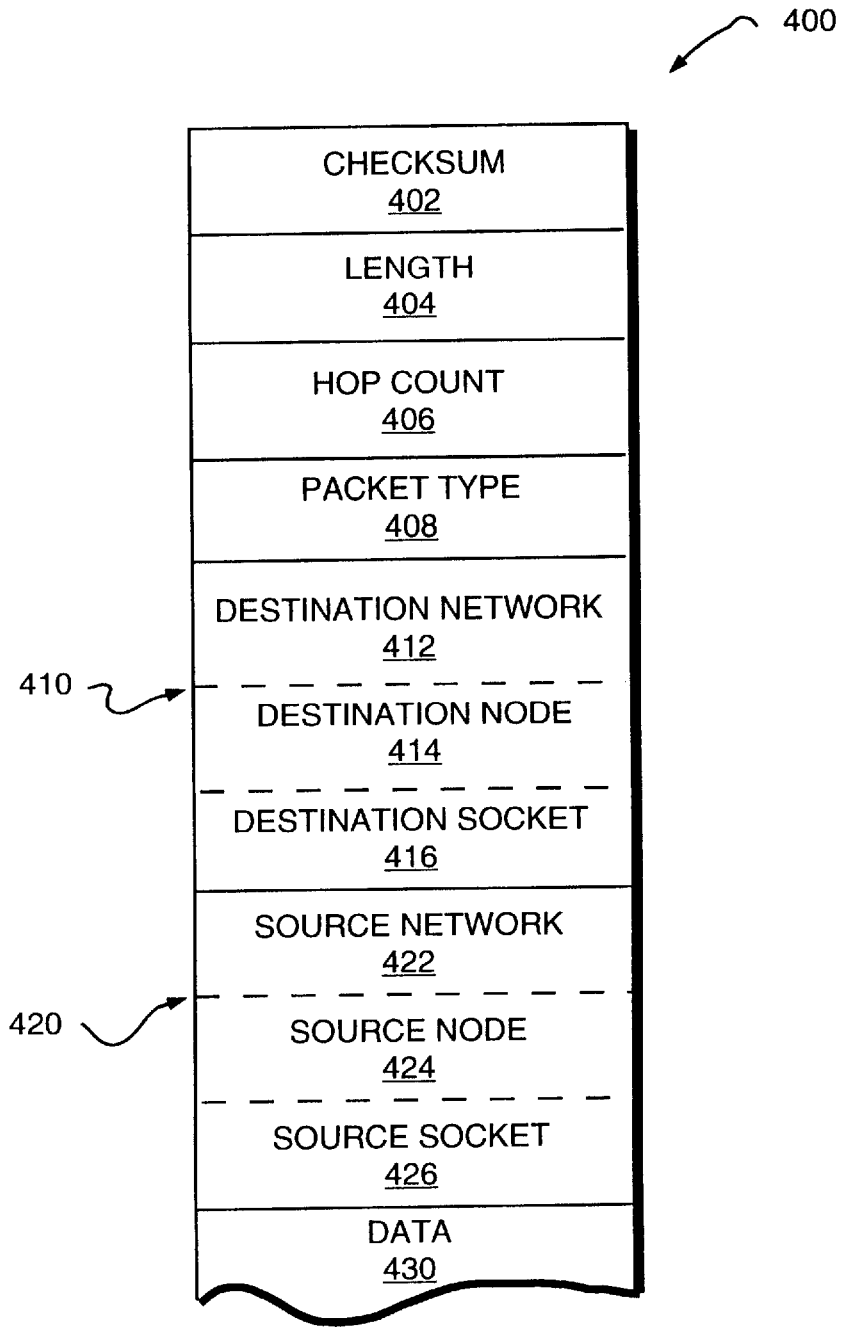
FIG. 4 is a schematic diagram depicting the format of a conventional IPX network layer header.

FIG. 4 depicts the format of a conventional IPX network layer packet 400 having a header comprising approximately 30 bytes. Specifically, the header includes a 2-byte checksum field 402, a 2-byte packet length field 404, a 1-byte hop count field 406 and a single byte packet type field 408. As is the case with headers defined by most network layer services, the IPX header contains fixed-length, hierarchical source and destination addresses, each of which includes a plurality of address elements. That is, the destination address 410 comprises a 4-byte destination network field 412 that indicates the particular network over which the packet will travel, a 6-byte destination node field 414 identifying the data link layer address of the receiving node on that network and a 2-byte destination socket field 416 specifing the receiving process in the receiving node. Similarly, the source address 420 comprises a 4-byte source network field 422, a 6-byte source node field 424 and a 2-byte source socket field 426. Data field 430 is appended to the header, immediately following the source address field 420.

The conventional hierarchical addresses described above are sufficient to accomodate routing of data among nodes coupled to computer networks of domain 200 using conventional intradomain routers R1 and R2. It may be desirable, though, to increase the number of nodes capable of exchanging data by interconnecting various domains with interdomain routers, i.e., those routers within corresponding domains that are capable of reaching other domains across the networks. This requires expanding the address spaces of the nodes coupled to each domain. However, address expansion for the IPX header (and most network layer headers) is generally constrained because of the fixed formats of their address fields. In addition, the fixed format of the conventional IPX packet 400 obviates expansion to accomodate expanded header fields in a manner that is compatible with the remaining fields, e.g., the data field 430, of the packet.

In accordance with the present invention, a novel arrangement is provided for expanding the address spaces of nodes coupled to computer networks in a manner that efficiently enhances routing among different domains of the networks. Specifically, the arrangement improves network addressing by adding domain elements to a conventional hierarchical network address. In the case of the IPX protocol, network addressing is improved by modifying existing destination network and socket elements of the conventional network address to effectively create an improved network layer header, whereas for the IP and CLNP protocols, the novel domain elements may be incorporated as options. Such improvements maximize the capabilities of interdomain routers configured to decipher the new information, while ensuring that conventional intradomain routers continue to operate on the contents of information fields constituting the conventional network layer headers.

Figure 5:
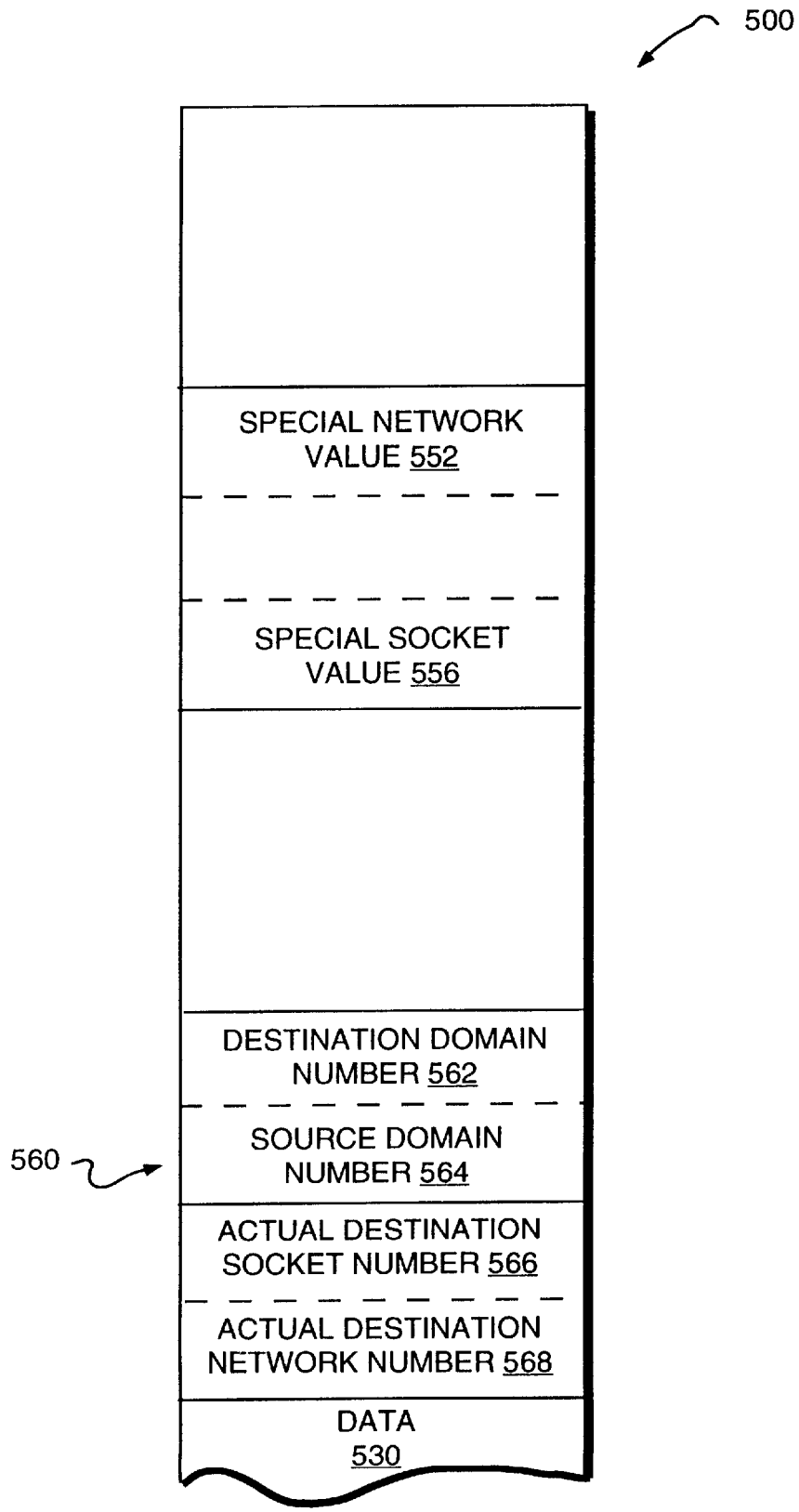
FIG. 5 is a schematic diagram illustrating an improved format of the IPX network layer header of FIG. 4 according to the novel network addressing arrangement.

FIG. 5 is a schematic diagram illustrating the format of the improved network layer header 500. According to the novel arrangement, a special network value 552 is provided that uniquely identifies interdomain routers. In the case of the IPX header, a source node substitutes this special network value for the actual destination network number within the 4-byte destination network field 412 of the conventional network layer destination address 410 (FIG. 4), primarily because routing is based on the destination network number. For the IP and CLNP headers, however, a special destination address value may be substituted for the actual destination addresses 324 and 362 (FIGS. 3A and 3B).

In addition, the arrangement provides for expanding the format of a network layer header having fixed length addresses in a manner that is compatible with existing routers and destination nodes. In the case of an IPX header, the source node substitutes a special socket value 556 for the actual destination socket number within the 2-byte destination socket field 416 of that conventional address. Preferably, the special socket value indicates the provision of additional header information after the source address fields of the packet; more particularly, the special socket value instructs the interdomain routers to examine the contents of expanded header fields 560 prior to forwarding packets over the networks. For other network layer headers, such as IP and CLNP, header expansion may be indicated by special values for either version fields (see FIGS. 3A and 3B at 314 and 354, respectively) or type fields (shown at 316 and 356).

Furthermore, the inventive arrangement provides novel domain numbers for uniquely identifying the interconnected domains. As noted, these domain numbers may be provided as options in the header option fields 326 and 366 of the IP and CLNP packets 310 and 350, respectively. Referring to FIG. 3C, a new option type is defined for the domains, the option type comprising, inter alia, an option code, e.g., "DOMAIN", stored in field 382 that uniquely specifies source and destination domains.

Because of the generally fixed format of the IPX network layer header 500, however, the domain numbers are stored in the expanded header fields 560 of that header. Specifically, a destination domain number 562 specifies the domain of the destination node and a source domain number 564 identifies the domain of the source node generating the packet. Also contained within these expanded header field are the actual destination socket number 566 and the actual destination network number 568.

According to the invention, the interdomain routers are configured to unravel and act upon the supplementary information within the expanded fields 560 of header 500, while conventional intradomain routers, which are not configured to implement expanded addressing, may simply ignore that information without disrupting operation of the network. This backward compatibility feature is possible because the special network value 552 contained within the network field 412 of the destination address 410 of a packet uniquely identifies interdomain routers; an intradomain router receiving the packet simply forwards that packet onto the appropriate interdomain router based solely on the contents of the destination network field of the header.

The expanded header fields are preferably of variable size to accommodate additional features. For example, the new expanded header format allows source nodes to take advantage of certain optimizations if some or all of the intermediate routers are configured to implement the inventive arrangement. These optimizations include prioritizing a particular packet for urgent (rather than normal) transmission delivery and requesting an error report in the event a router "drops" a packet because of a problem. This latter feature provides a source node with sufficient information to determine whether it would be useful to retransmit the packet. With respect to the modified IPX header, the variable size of the expanded header allows other optimizations to be added in the future in a compatible location within the packet.

Operation of the expanded addresses contained within the improved network layer header 500 will now be described in connection with a system of interconnected computer networks shown in FIG. 6. The system 600 comprises a plurality of domains A-C coupled to a backbone network 610. In the illustrative embodiment, the domains may include independent IPX networks, such as the Novell Corporate IPX network and the Microsoft Corporate IPX network, while the backbone network may be an AT&T/IPX Internet.

Within each domain, routing is based on the 4-byte destination network number 412 (FIG. 4) and, therefore, these numbers are assigned so that they are unique within each IPX network domain. Also, each domain is dynamically assigned a unique domain number as it is coupled to the backbone network. This is significant because if a domain is reconfigured to "hook" into the backbone network at a different time or place and is assigned a new domain number, addresses within the domain do not have to be reassigned.

Each domain further contains intradomain routers that are not configured to operate in accordance with the extra level of addressing described herein; yet, a source node S in domain A must still be able to communicate with a destination node D in another domain, e.g., domain C. Accordingly, each domain includes at least one interdomain router that connects its corresponding domain to the backbone network 610.

Figure 6:
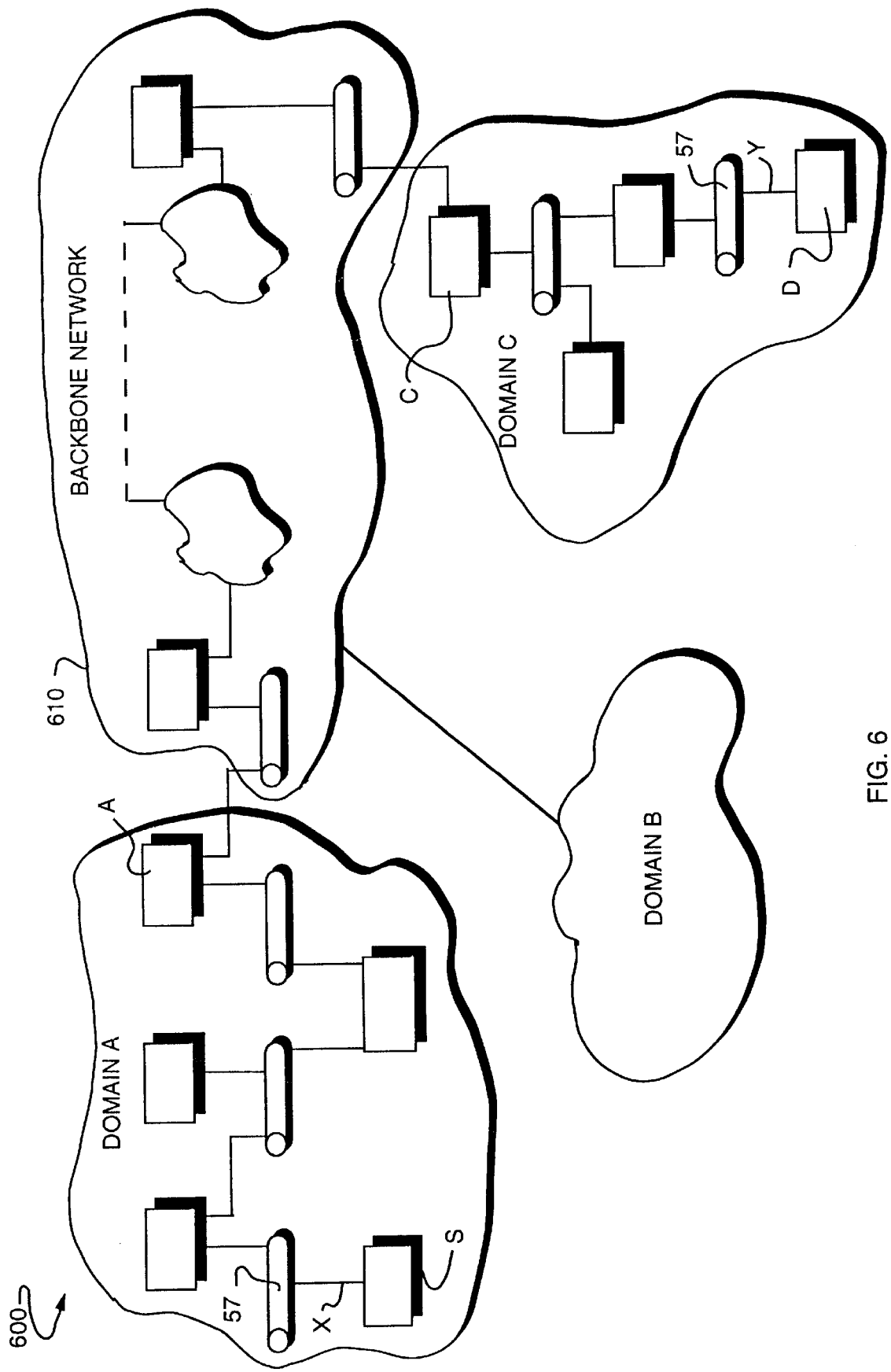
FIG. 6 is a schematic block diagram of a system of interconnected computer networks comprising a plurality of domains coupled to a backbone network in which the novel network addressing arrangement of the present invention may be advantageously used.

As can be seen in FIG. 6, LANs contained in domains A and C have similar network numbers, e.g., 57. Furthermore, the destination node D in domain C has a data link layer address D and a socket number Y, while the source node S in domain A has a data link layer address S and a socket number X. The full address of destination node D is thus domain C, network 57, node D, socket Y and the full address of the source node S is domain A, network 57, node S, socket X. This addressing scheme may be configured to conform with both the conventional and improved IPX header formats by defining a special network value, e.g., "27", for the destination network address that uniquely specifies interdomain routers. Other intradomain routers that receive a packet specifying this network value simply route the packet onto the appropriate node.

When the appropriate interdomain router receives the packet, it decodes the special socket value, e.g., "55", which instructs the router to examine the contents of the expanded header fields prior to forwarding the packet over the networks. As noted, the contents of the expanded header fields include the actual destination socket and network numbers, along with the destination and source domain numbers.

Operationally, the source node S in domain A sets the destination network and socket numbers of a network layer header to their special values (i.e., "27" and "55", respectively) prior to sending a packet to destination node D in domain C. The packet is then transmitted over the networks, where intermediate intradomain routers simply forward the packet to the appropriate interdomain router based on the special network value. In some cases, there might be several different interdomain routers that attach to the backbone network 610, each of which responds to the special network value "27". The source node S and any intradomain routers forward the packet to the nearest interdomain router connected to the backbone network. Since all routers in domain A route the packet based on the special network value, the inventive arrangement allows each router to generate a fast forwarding decision to an interdomain router, e.g., router A.

Upon reaching that router, the packet is analyzed in accordance with the special socket value "55" of the destination network address; that is, the interdomain router A examines the contents of the expanded header fields to determine if its corresponding destination domain number is specified in the packet. Since the destination domain number contained in the expanded header fields is C, interdomain router A forwards the packet on to interdomain router C. When the packet reaches this latter router, interdomain router C replaces ("overwrites") the special value of the destination network number with the actual destination network number contained in the expanded header fields, and proceeds to route the packet to destination node D on network 57.

At destination node D, each process executing on that computer "listens" on a predefined socket, such as socket number Y. If there is no process that responds to that addressed socket, destination node D drops the packet. That is, if the destination node cannot associate the socket with an internal process, it discards the packet. However, if there is a process monitoring the specified socket number Y, that process accepts and processes the packet. This guarantees that destination nodes, including conventional nodes, are not confused by the expanded header field packet structure according to the invention.

In summary, the present invention provides a technique for expanding network addresses from a seemingly immutable packet format in a manner that obviates upgrading of conventional intradomain routers. Since only interdomain routers need be configured to interpret the inventive addressing arrangement, the technique provides an advantage that enables backward compatibility with existing routers.

In addition, the inventive addressing arrangement facilitates routing based on different sections of the network layer address. This feature of the invention increases the efficiency of network addressing because most routers need only examine a designated portion, i.e., the 4-byte destination network number field, of the network layer header prior to forwarding packets. Only an interdomain router need examine the remainder of the addressing information.

While there has been shown and described an illustrative embodiment for implementing a novel arrangement for expanding the network layer header and address spaces of nodes in a manner that is backward compatible with nodes that are not configured to implement the novel technique, such as intradomain routers and certain destination nodes, it is to be understood that various other adaptations and modifications may be made within the spirit and scope of the invention. For example, a sending process of a source node that employs the expanded header format must be aware that the destination node may not understand this format. If there is no indication that the destination is configured to implement the novel header format, the source should send both conventional and new types of header packets to ensure reception of the information.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A network layer header for expanding the address space of a node coupled to a computer network having a plurality of domains interconnected by interdomain routers, the header forming a part of a packet and containing address fields for storing hierarchical destination address elements that identify a destination node for receiving the packet, the header comprising:

a special destination address that uniquely identifies the interdomain routers, the special destination address replacing an actual destination address comprised in said destination address elements; and a special value that indicates provision of expanded header fields appended to the address fields, the special value being placed in one of a version field and a type field of the network layer header.

2. The network layer header of claim 1 wherein the special value replaces the contents of one of the version field and type field of the network layer header.

3. The network layer header of claim 1 wherein the header further comprises an option field in which is placed one of a domain number and option code for identifying at least one domain of said computer network.

4. The network layer header of claim 3 wherein the option field contains information that uniquely specifies source and destination domains of said packet in said computer network.

5. A network layer header for expanding the address space of a node coupled to a computer network having a plurality of domains interconnected by interdomain routers, the header forming a part of a packet and containing address fields for storing hierarchical destination address elements that identify a destination node for receiving the packet, the header comprising:

a special network value that uniquely identifies the interdomain routers, the special network value replacing an actual destination network value of the hierarchical destination address; and a special socket value indicating provision of expanded header fields appended to the address fields, the special socket value replacing an actual destination socket value of the hierarchical destination address;

wherein said expanded header fields contain said actual destination network value and actual destination socket value, and information that uniquely specifies source and destination domains of said packet in said computer network.

6. A method for expanding a network layer header format and address space of a node coupled to a computer network having a plurality of domains interconnected by interdomain routers, the header forming a part of a packet and containing address fields for storing hierarchical destination address elements that identify a destination node for receiving the packet, the method comprising the steps of:

replacing an actual destination network value of the hierarchical destination address with a special network value that uniquely identifies the interdomain routers; and substituting a special socket value for an actual destination socket value of the hierarchical destination address, the special socket value indicating provision of expanded header fields appended to the address fields;

wherein said expanded header fields contain information that uniquely specifies source and destination domains of said packet in said computer network.

7. The method of claim 6 the information comprises a novel destination domain number for uniquely identifying the domain of the destination node.

8. A computer readable medium containing executable program instructions for expanding a network layer header format and address space of a node coupled to a computer network having a plurality of domains interconnected by interdomain routers, the header forming a part of a packet and containing address fields for storing hierarchical destination address elements that identify a destination node for receiving the packet, the executable program instructions comprising the program instructions for:

replacing an actual destination network value of the hierarchical destination address with a special network value that uniquely identifies the interdomain routers; and substituting a special socket value for an actual destination socket value of the hierarchical destination address, the special socket value indicating provision of expanded header fields appended to the address fields;

wherein said expanded header fields contain information that uniquely specifies source and destination domains of said packet in said network.

9. The computer readable medium of claim 8 further comprising program instructions for providing a novel destination domain number for uniquely identifying the domain of the destination node.

10. The computer readable medium of claim 9 further comprising program instructions for storing the novel destination domain number along with actual destination socket and network numbers in the expanded header fields.

\* \* \* \* \*